(12) United States Patent
Hu et al.

(10) Patent No.: US 12,354,595 B2
(45) Date of Patent: Jul. 8, 2025

(54) DELIBERATION BY TEXT-ONLY AND SEMI-SUPERVISED TRAINING

(71) Applicant: Google LLC, Mountain View, CA (US)

(72) Inventors: Ke Hu, Stony Brook, NY (US); Tara N. Sainath, Jersey City, NJ (US); Yanzhang He, Palo Alto, CA (US); Rohit Prabhavalkar, Palo Alto, CA (US); Sepand Mavandadi, Mountain View, CA (US); Weiran Wang, Palo Alto, CA (US); Trevor Strohman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 305 days.

(21) Appl. No.: 18/186,157

(22) Filed: Mar. 18, 2023

(65) Prior Publication Data

US 2023/0298563 A1    Sep. 21, 2023

Related U.S. Application Data

(60) Provisional application No. 63/269,617, filed on Mar. 19, 2022.

(51) Int. Cl.
*G10L 13/08*    (2013.01)
*G10L 15/06*    (2013.01)
*G10L 15/16*    (2006.01)

(52) U.S. Cl.
CPC ............ *G10L 13/08* (2013.01); *G10L 15/063* (2013.01); *G10L 15/16* (2013.01)

(58) Field of Classification Search
None
See application file for complete search history.

(56) References Cited

U.S. PATENT DOCUMENTS

2020/0312306 A1*  10/2020  Moritz ................... G10L 15/16
2021/0225369 A1*  7/2021  Hu ......................... G06N 3/044
(Continued)

OTHER PUBLICATIONS

Hu et al., Transformer Based Deliberation for Two-Pass Speech Recognition, Jan. 2021 (Year: 2021).*
(Continued)

*Primary Examiner* — Nafiz E Hoque
(74) *Attorney, Agent, or Firm* — Honigman LLP; Brett A. Krueger; Grant Griffith

(57) ABSTRACT

A method of text-only and semi-supervised training for deliberation includes receiving training data including unspoken textual utterances that are each not paired with any corresponding spoken utterance of non-synthetic speech, and training a deliberation model that includes a text encoder and a deliberation decoder on the unspoken textual utterances. The method also includes receiving, at the trained deliberation model, first-pass hypotheses and non-causal acoustic embeddings. The first-pass hypotheses is generated by a recurrent neural network-transducer (RNN-T) decoder for the non-causal acoustic embeddings encoded by a non-causal encoder. The method also includes encoding, using the text encoder, the first-pass hypotheses generated by the RNN-T decoder, and generating, using the deliberation decoder attending to both the first-pass hypotheses and the non-causal acoustic embeddings, second-pass hypotheses.

20 Claims, 9 Drawing Sheets

(56) References Cited

U.S. PATENT DOCUMENTS

2022/0139380 A1* 5/2022 Meng .................. G06N 3/044
                                                              704/232
2023/0081306 A1* 3/2023 Kuo ..................... G06N 3/09
                                                              704/200

OTHER PUBLICATIONS

International Search Report and Written Opinion for the related Application No. PCT/US2023/015584, dated Jul. 5, 2023, 64 pages.
Hu Ke et al: "Transformer Based Deliberation for Two-Pass Speech Recognition", 2021 IEEE Spoken Language Technology Workshop (SLT), Jan. 19, 2021, pp. 68-74, XP093000484, 7 pages.
Mavandadi Sepand et al: "A Deliberation-Based Joint Acoustic and Text Decoder", •Interspeech 2021, Aug. 30, 2021, pp. 2057-2061, XP093001137, ISCA, 5 pages.
Sainath Tara N et al: "An Attention-Based Joint Acoustic and Text on-Device End-To-End Model", ICASSP 2020—2020 IEEE International Conference on Acoustics, Spe:ech and Si(3-nal Processin (ICASSP), IEEE, May 4, 2020, pp. 70.39-7043, XP033793174, DOI: 10.1109/ICASSP40776.2020. 9053510, 5 pages.
Hu Ke et al: "Deliberation Model Based Two-Pass End-To-End Speech Recognition", ICASSP 2020—2020 IEEE-International Conference on Acoustics, Speech and Signal Processing (ICASSP), IEEE, May 4, 2020, p. 7799-7803, XP033793266, DOI: 10.1109/ICASSP40776.2020.9053606, 5 pages.
Jinyu Li: "Recent Advances in End-to-End Automatic Speech Recognition", arxiv.org, Cornell University Library, 201 Olin Library Cornell University Ithaca, NY 14853, Feb. 2, 2022 (Feb. 2, 2022), XP091146370, 27 pages.

\* cited by examiner

DELIBERATION BY TEXT-ONLY AND SEMI-SUPERVISED TRAINING

CROSS REFERENCE TO RELATED APPLICATIONS

This U.S. patent application claims priority under 35 U.S.C. § 119(e) to U.S. Provisional Application 63/269,617, filed on Mar. 19, 2022. The disclosure of this prior application is considered part of the disclosure of this application and is hereby incorporated by reference in its entirety.

TECHNICAL FIELD

This disclosure relates to deliberation by text-only and semi-supervised training.

BACKGROUND

Modern automated speech recognition (ASR) systems focus on providing not only high quality (e.g., a low word error rate (WER)), but also low latency (e.g., a short delay between the user speaking and a transcription appearing). Moreover, when using an ASR system today there is a demand that the ASR system decode utterances in a streaming fashion that corresponds to real-time or even faster than real-time. To illustrate, when an ASR system is deployed on a mobile phone that experiences direct user interactivity, an application on the mobile phone using the ASR system may require the speech recognition to be streaming such that words appear on the screen as soon as they are spoken. Here, it is also likely that the user of the mobile phone has a low tolerance for latency. Due to this low tolerance, the speech recognition strives to run on the mobile device in a manner that minimizes an impact from latency and inaccuracy that may detrimentally affect the user's experience.

SUMMARY

One aspect of the disclosure provides a computer-implemented method that when executed on data processing hardware causes the data processing hardware to perform operations that include receiving training data including unspoken textual utterances that are each not paired with any corresponding spoken utterance of non-synthetic speech, and training a deliberation model that includes a text encoder and a deliberation decoder on the unspoken textual utterances. The operations also include receiving, at the trained deliberation model, first-pass hypotheses and non-causal acoustic embeddings. The first-pass hypotheses is generated by a recurrent neural network-transducer (RNN-T) decoder for the non-causal acoustic embeddings encoded by a non-causal encoder. The operations also include encoding, using the text encoder, the first-pass hypotheses generated by the RNN-T decoder, and generating, using the deliberation decoder attending to both the first-pass hypotheses and the non-causal acoustic embeddings, second-pass hypotheses.

Implementations of the disclosure may include one or more of the following optional features. In some implementations, the operations further include receiving a sequence of acoustic frames and encoding, using a casual encoder, each acoustic frame in the sequence of acoustic frames into a corresponding causal acoustic embedding. The operations also include generating, using the non-causal encoder configured to receive the encoded causal acoustic embeddings as input, the non-causal acoustic embeddings, and decoding, using the RNN-T decoder, the non-causal acoustic embeddings to generate the first-pass hypotheses. In some examples, the deliberation decoder includes a long short-term memory (LSTM) network followed by a softmax layer. Here, the LSTM network may include at least two layers. In some implementations, the text encoder includes a stack of self-attention blocks each having a multi-headed self-attention mechanism. In these implementations, each self-attention block may include one of a Conformer block or a Transformer block.

In some examples, training the deliberation model includes pre-training the text encoder on each unspoken textual utterance by tokenizing the corresponding unspoken textual utterance into a sequence of sub-word units. This example also includes replacing each tokenized sub-word unit in a first portion of the tokenized sequence of sub-word units with a mask token, and replacing each token sub-word unit in a second portion of the tokenized sequence of sub-word units with a random token. Additionally or alternatively, training the deliberation model includes generating, using a text-to-speech model, a corresponding synthetic speech representation for each unspoken textual utterance of the received training data, and training the deliberation model using the unspoken textual utterances and corresponding synthetic speech representations.

In some implementations, the training data further includes un-transcribed non-synthetic speech utterances, each un-transcribed non-synthetic speech utterance not paired with a corresponding transcription. In these implementations, the operations further include predicting, using a trained speech recognition model, the corresponding transcription for each un-transcribed non-synthetic speech utterance. Here, training the deliberation model further includes training the deliberation decoder using the un-transcribed non-synthetic speech utterances and the corresponding predicted transcriptions as semi-supervised data. In some examples, generating the second-pass hypotheses includes generating, using a first attention mechanism attending to the encoded first-pass hypotheses, first context vectors, generating, using a second attention mechanism attending to the non-causal acoustic embeddings, second context vectors, and decoding the first context vectors and the second context vectors at the deliberation decoder to form the second-pass hypotheses.

Another aspect of the disclosure provides a system including data processing hardware and memory hardware in communication with the data processing hardware. The memory hardware stores instructions that when executed by the data processing hardware cause the data processing hardware to perform operations that include receiving training data including unspoken textual utterances that are each not paired with any corresponding spoken utterance of non-synthetic speech, and training a deliberation model that includes a text encoder and a deliberation decoder on the unspoken textual utterances. The operations also include receiving, at the trained deliberation model, first-pass hypotheses and non-causal acoustic embeddings. The first-pass hypotheses is generated by a recurrent neural network-transducer (RNN-T) decoder for the non-causal acoustic embeddings encoded by a non-causal encoder. The operations also include encoding, using the text encoder, the first-pass hypotheses generated by the RNN-T decoder, and generating, using the deliberation decoder attending to both the first-pass hypotheses and the non-causal acoustic embeddings, second-pass hypotheses.

This aspect may include one or more of the following optional features. In some implementations, the operations further include receiving a sequence of acoustic frames and encoding, using a casual encoder, each acoustic frame in the sequence of acoustic frames into a corresponding causal acoustic embedding. The operations also include generating, using the non-causal encoder configured to receive the encoded causal acoustic embeddings as input, the non-causal acoustic embeddings, and decoding, using the RNN-T decoder, the non-causal acoustic embeddings to generate the first-pass hypotheses. In some examples, the deliberation decoder includes a long short-term memory (LSTM) network followed by a softmax layer. Here, the LSTM network may include at least two layers. In some implementations, the text encoder includes a stack of self-attention blocks each having a multi-headed self-attention mechanism. In these implementations, each self-attention block may include one of a Conformer block or a Transformer block.

In some examples, training the deliberation model includes pre-training the text encoder on each unspoken textual utterance by tokenizing the corresponding unspoken textual utterance into a sequence of sub-word units. This example also includes replacing each tokenized sub-word unit in a first portion of the tokenized sequence of sub-word units with a mask token, and replacing each token sub-word unit in a second portion of the tokenized sequence of sub-word units with a random token. Additionally or alternatively, training the deliberation model includes generating, using a text-to-speech model, a corresponding synthetic speech representation for each unspoken textual utterance of the received training data, and training the deliberation model using the unspoken textual utterances and corresponding synthetic speech representations.

In some implementations, the training data further includes un-transcribed non-synthetic speech utterances, each un-transcribed non-synthetic speech utterance not paired with a corresponding transcription. In these implementations, the operations further include predicting, using a trained speech recognition model, the corresponding transcription for each un-transcribed non-synthetic speech utterance. Here, training the deliberation model further includes training the deliberation decoder using the un-transcribed non-synthetic speech utterances and the corresponding predicted transcriptions as semi-supervised data. In some examples, generating the second-pass hypotheses includes generating, using a first attention mechanism attending to the encoded first-pass hypotheses, first context vectors, generating, using a second attention mechanism attending to the non-causal acoustic embeddings, second context vectors, and decoding the first context vectors and the second context vectors at the deliberation decoder to form the second-pass hypotheses.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
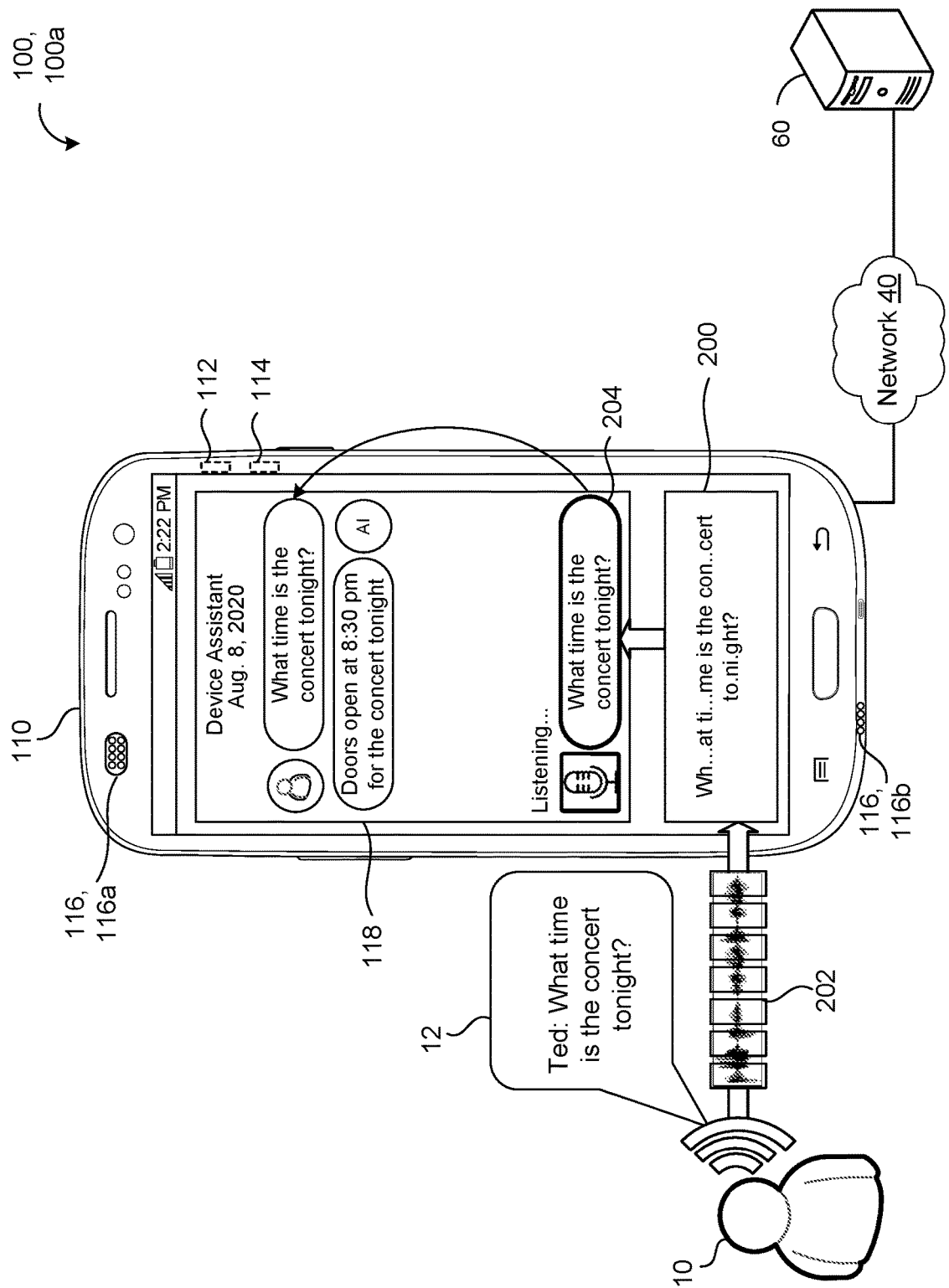
FIGS. 1A and 1B are schematic views of example speech environments using a pre-trained deliberation two-pass architecture.

Speech recognition continues to evolve to meet the untethered and the nimble demands of a mobile environment. New speech recognition architectures or improvements to existing architectures continue to be developed that seek to increase the quality of automatic speech recognition systems (ASR). To illustrate, speech recognition initially employed multiple models where each model had a dedicated purpose. For instance, an ASR system included an acoustic model (AM), a pronunciation model (PM), and a language model (LM). The acoustic model mapped segments of audio (i.e., frames of audio) to phonemes. The pronunciation model connected these phonemes together to form words while the language model was used to express the likelihood of given phrases (i.e., the probability of a sequence of words). Although these individual models worked together, each model was trained independently and often manually designed on different datasets.

The approach of separate models enables a speech recognition system to be fairly accurate, especially when the training corpus (i.e., body of training data) for a given model caters to the effectiveness of the model. However, the need to independently train separate models introduced its own complexities and led to an architecture with integrated models. These integrated models sought to use a single neural network to directly map an audio waveform (i.e., input sequence) to an output sentence (i.e., output sequence). This resulted in a sequence-to-sequence approach, which generated a sequence of words (or graphemes) when given a sequence of audio features. Examples of sequence-to-sequence models include "attention-based" models and "listen-attend-spell" (LAS) models. A LAS model transcribes speech utterances into characters using a listener component, an attender component, and a speller component. Here, the listener is a recurrent neural network (RNN) encoder that receives an audio input (e.g., a time-frequency representation of speech input) and maps the audio input to a higher-level feature representation. The attender attends to the higher-level feature to learn an alignment between input features and predicted subword units (e.g., a grapheme or a wordpiece). The speller is an attention-based RNN decoder that generates character sequences from the input by producing a probability distribution over a set of hypothesized words. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system.

Although early E2E models proved accurate and a training improvement over individually trained models, these E2E models, such as the LAS model, functioned by reviewing an entire input sequence before generating output text, and thus, did not allow streaming outputs as inputs were received. Without streaming capabilities, an LAS model is unable to perform real-time voice transcription. Due to this deficiency, deploying the LAS model for speech applications that are latency sensitive and/or require real-time voice transcription may pose issues. This makes an LAS model alone not an ideal model for mobile technology (e.g., mobile phones) that often relies on real-time applications (e.g., real-time communication applications).

Additionally, speech recognition systems that have acoustic, pronunciation, and language models, or such models composed together, may rely on a decoder that has to search a relatively large search graph associated with these models. With a large search graph, it is not conducive to host this type of speech recognition system entirely on-device. Here, when a speech recognition system is hosted "on-device," a device that receives the audio input uses its processor(s) to execute the functionality of the speech recognition system. For instance, when a speech recognition system is hosted entirely on-device, the processors of the device do not need to coordinate with any off-device computing resources to perform the functionality of the speech recognition system. A device that performs speech recognition not entirely on-device relies on remote computing (e.g., of a remote computing system or cloud computing) and therefore online connectivity to perform at least some function of the speech recognition system. For example, a speech recognition system performs decoding with a large search graph using a network connection with a server-based model.

Unfortunately, being reliant upon a remote connection makes a speech recognition system vulnerable to latency issues and/or inherent unreliability of communication networks. To improve the usefulness of speech recognition by avoiding these issues, speech recognition systems have again evolved into a form of a sequence-to-sequence model known as a recurrent neural network transducer (RNN-T). A RNN-T does not employ an attention mechanism and, unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters one-by-one as spoken. Here, an RNN-T uses a feedback loop that feeds symbols predicted by the model back into itself to predict the next symbols. Because decoding the RNN-T includes a beam search through a single neural network instead of a large decoder graph, an RNN-T may scale to a fraction of the size of a server-based speech recognition model. With the size reduction, the RNN-T may be deployed entirely on-device and able to run offline (i.e., without a network connection); therefore, avoiding unreliability issues with communication networks.

In addition to speech recognition systems operating with low latency, a speech recognition system also needs to be accurate at recognizing speech. Often for models that perform speech recognition, a metric that may define an accuracy of a model is a word error rate (WER). A WER refers to a measure of how many words are changed compared to a number of words actually spoken. Commonly, these word changes refer to substitutions (i.e., when a word gets replaced), insertions (i.e., when a word is added), and/or deletions (i.e., when a word is omitted). To illustrate, a speaker says "car," but an ASR system transcribes the word "car" as "bar." This is an example of a substitution due to phonetic similarity. When measuring the capability of an ASR system compared to other ASR systems, the WER may indicate some measure of improvement or quality capability relative to another system or some baseline.

Although an RNN-T model showed promise as a strong candidate model for on-device speech recognition, the RNN-T model alone still lags behind a large state-of-the-art conventional model (e.g., a server-based model with separate AM, PM, and LMs) in terms of quality (e.g., speech recognition accuracy). Yet a non-streaming E2E, LAS model has speech recognition quality that is comparable to large state-of-the-art conventional models. In a two-pass model, a non-streaming LAS model, for example, rescores streamed hypotheses from a first-pass. This second-pass LAS model approach attends to acoustics in order to rescore hypotheses. In contrast, an alternative method known as a class of neural correction model uses text instead of acoustics to generate hypotheses. In other words, there are different variables that may be attended to in order to refine a hypothesis in a second-pass. As such, the model proposed herein is a variation on the RNN-T/LAS two-pass model. This variant uses a deliberation network that combines acoustics and first-pass text hypotheses for the second pass of the two-pass model.

Figure 3A:
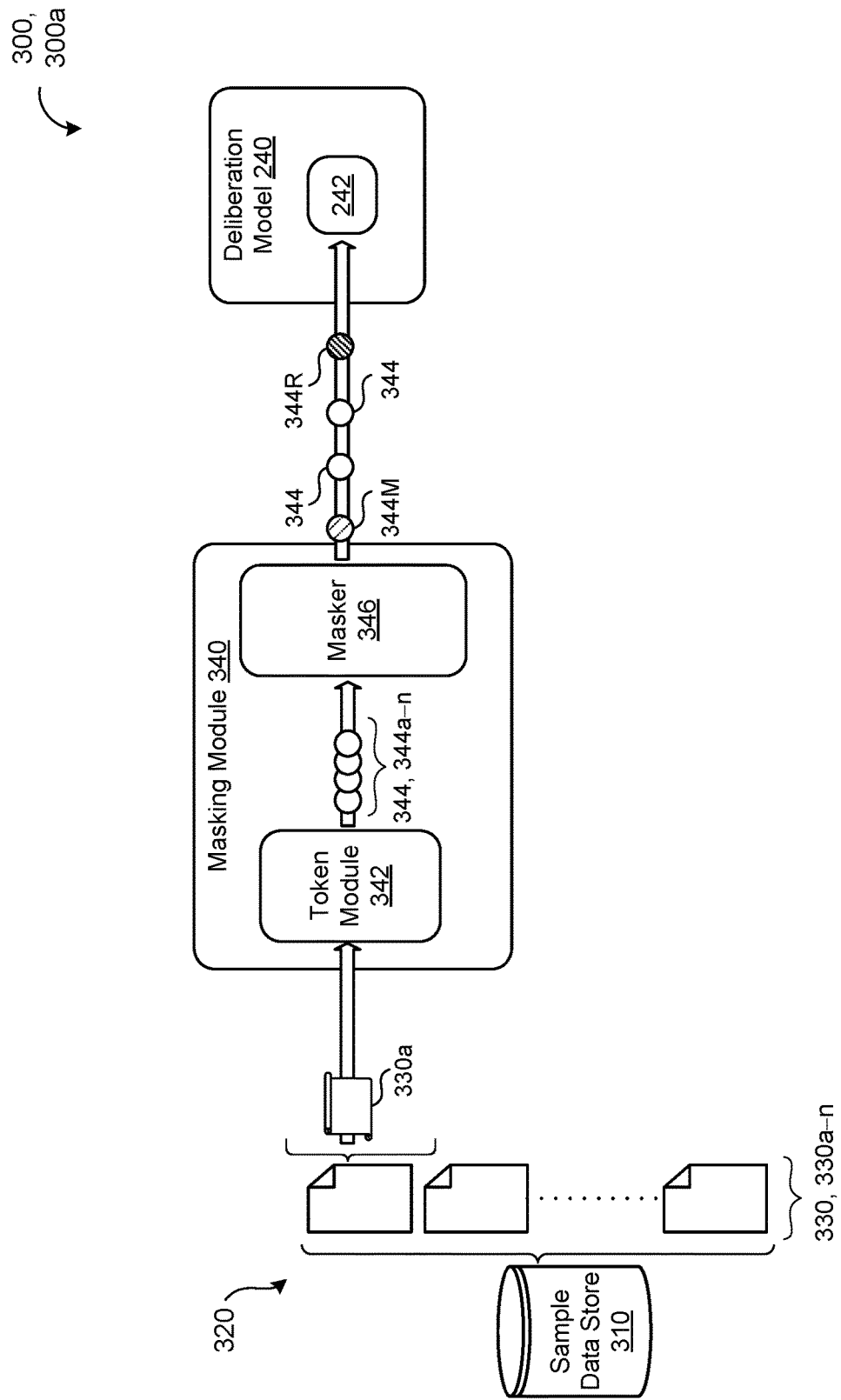
FIGS. 3A-3C are schematic views of an example training process for promoting a deliberation model of the deliberation two-pass architecture to learn consistent predictions.
Figure 3B:
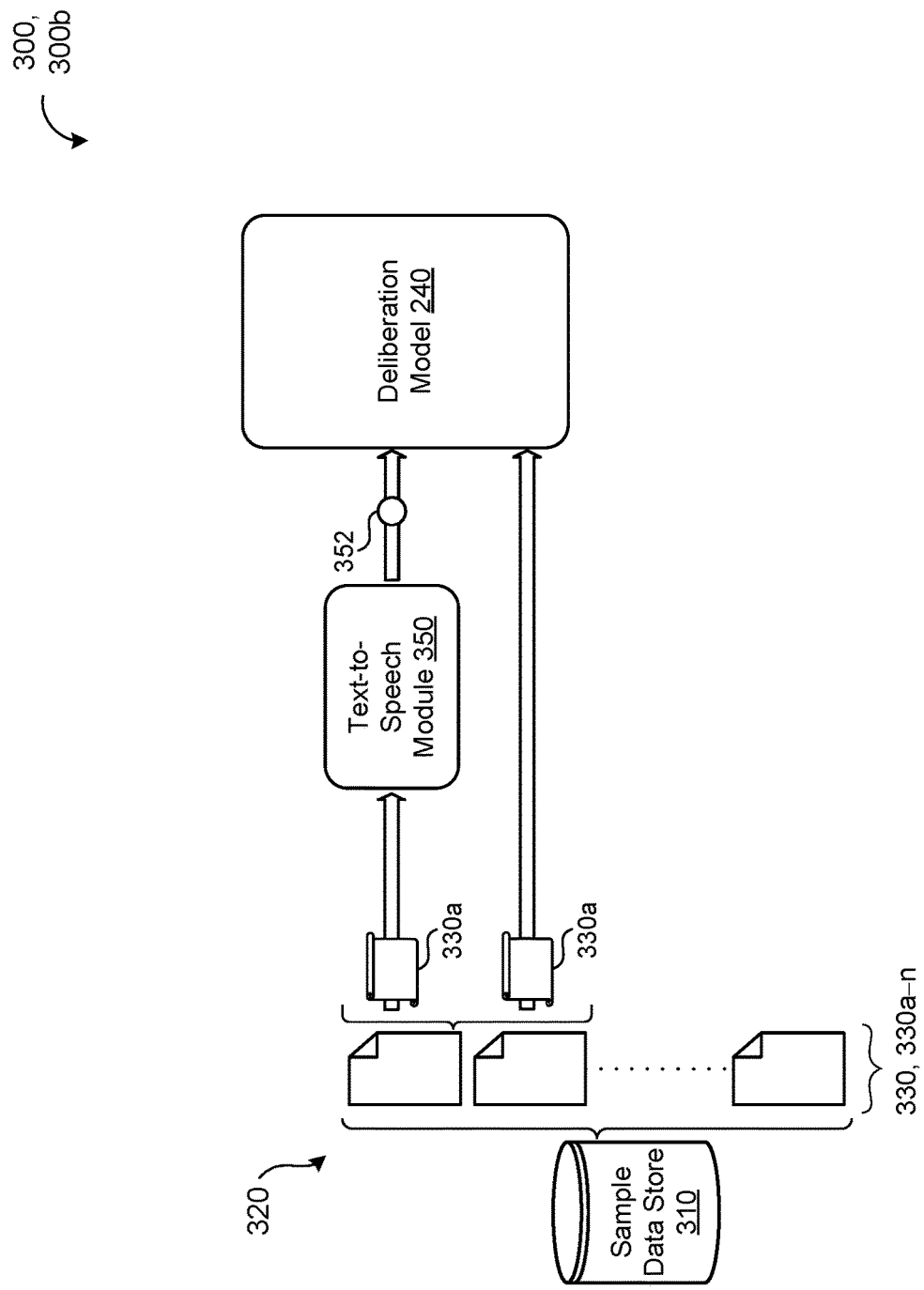
Figure 3C:
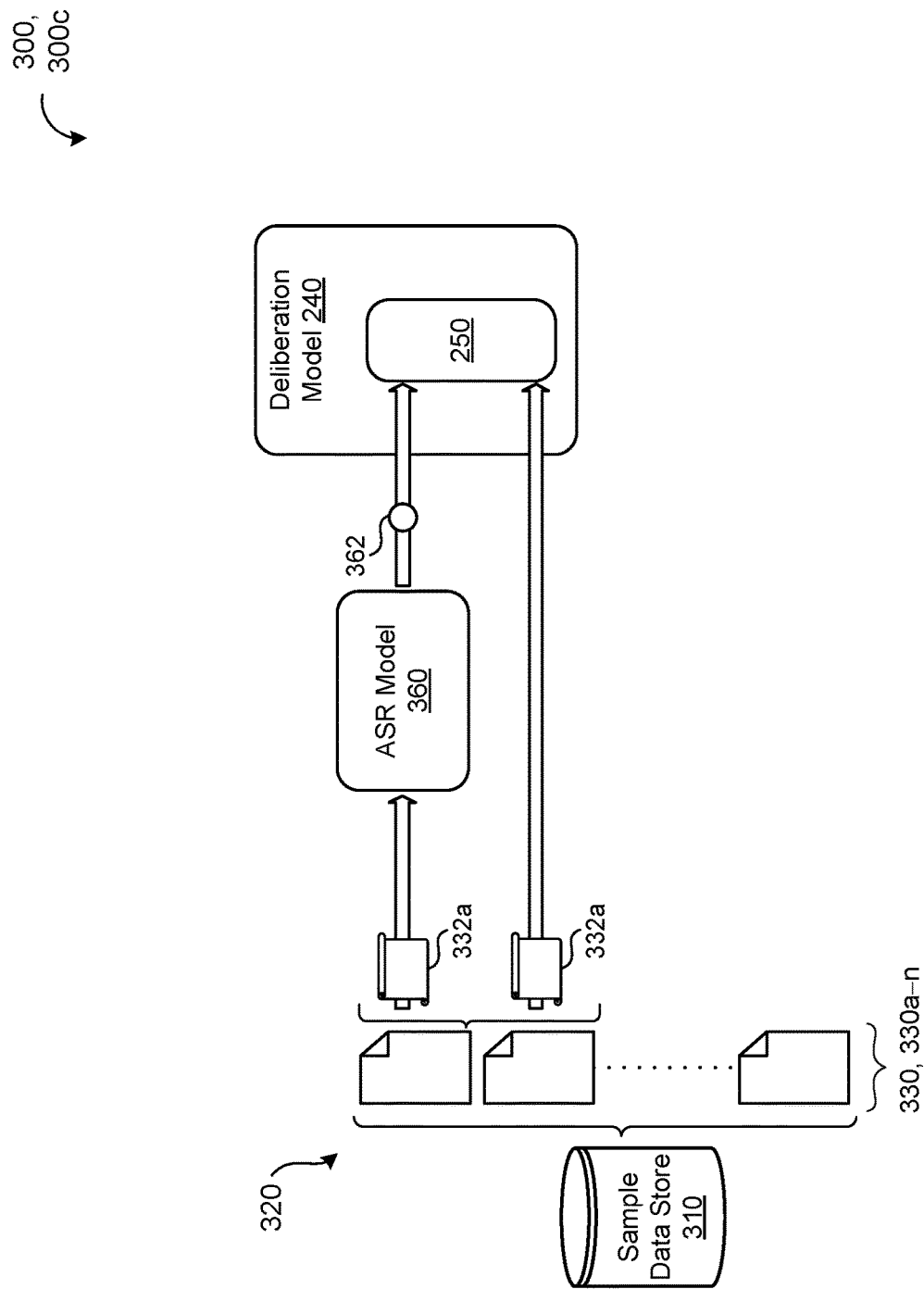

To improve on the quality of voice search, implementations herein are directed toward pre-training (e.g., as shown in FIGS. 3A-3C) the second pass of the deliberation network using text-only data in a masked language model. In addition to using text-only data, unlabeled audio utterances are used for semi-supervised training of the text encoder. By incorporating text-only data in pre-training the deliberation network, joint acoustic and text decoder training, and semi-supervised training in a single model, this pre-trained two-pass deliberation network may become more accurate than a large conventional speech recognition model. For instance, in some tests, the pre-trained two-pass deliberation network has achieved a 4.1% voice search performance improvement and near 12% long-tail WER reduction when compared to an untrained two-pass deliberation network, and 8% relative WER reduction when compared to a large convention recognition model.

Figure 1B:
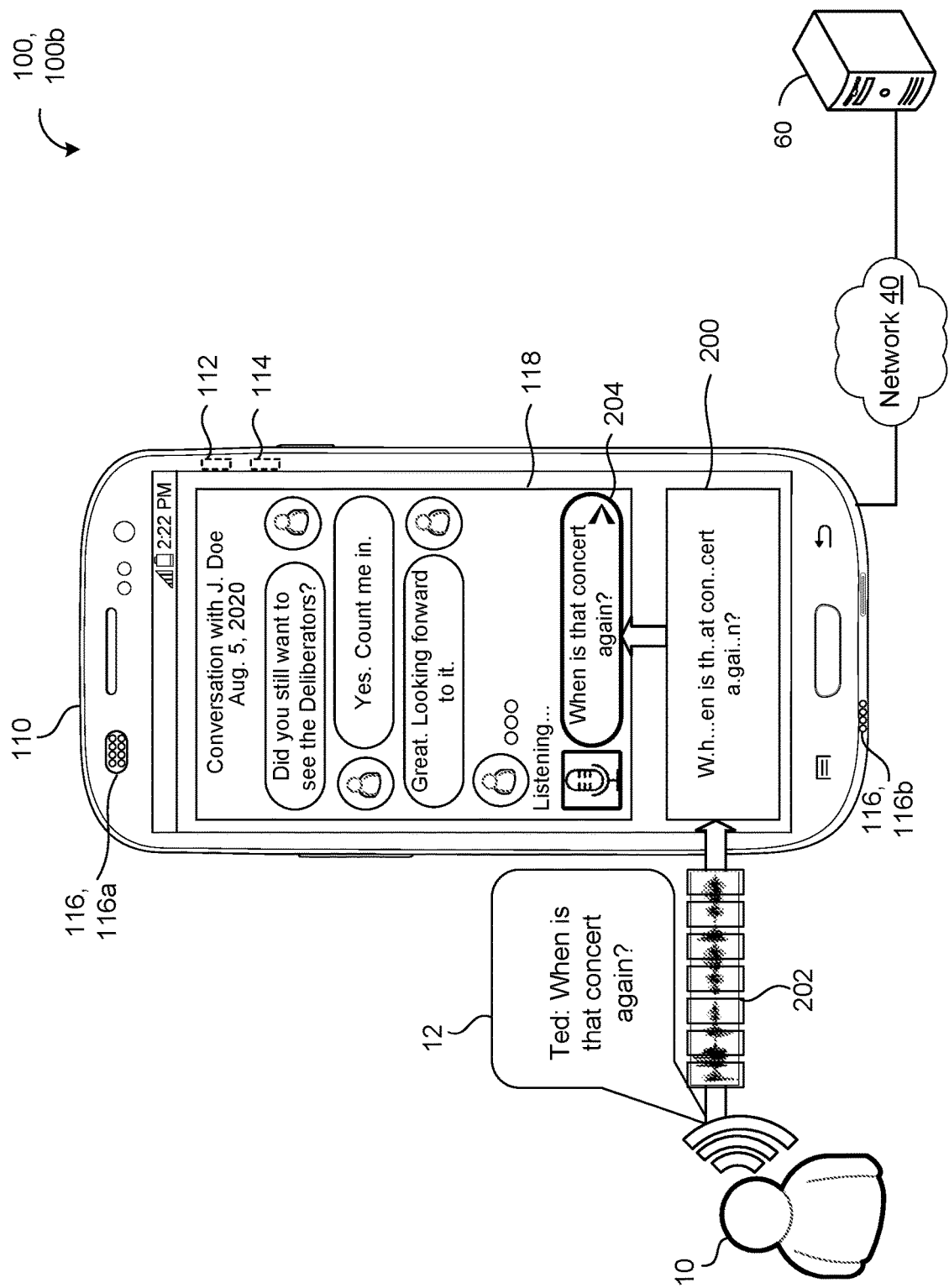

FIGS. 1A and 1B are example systems 100a, 100b including a speech environment 100 in which a user's 10 manner of interacting with a computing device, such as a user device 110, may be through voice input. The user device 110 (also referred to generally as a device 110) is configured to capture sounds (e.g., streaming audio data) from one or more users 10 within the speech-enabled environment. Here, the streaming audio data 12 may refer to a spoken utterance by the user 10 that functions as an audible query, a command for the device 110, or an audible communication captured by the device 110. Speech-enabled systems of the device 110 may field the query or the command by answering the query and/or causing the command to be performed.

The user device 110 may correspond to any computing device associated with a user 10 and capable of receiving audio data 12. Some examples of user devices 110 include, but are not limited to, mobile devices (e.g., mobile phones, tablets, laptops, etc.), computers, wearable devices (e.g., smart watches), smart appliances, internet of things (IoT) devices, smart speakers, etc. The user device 110 includes data processing hardware 112 and memory hardware 114 in communication with the data processing hardware 112 and storing instructions, that when executed by the data processing hardware 112, cause the data processing hardware 112 to perform one or more operations. The user device 110 further includes an audio subsystem 116 with an audio capture device (e.g., microphone) 116, 116a for capturing and converting spoken utterances 12 within the speech-enabled system 100 into electrical signals and a speech output device (e.g., a speaker) 116, 116b for communicating an audible audio signal (e.g., as output audio data from the device 110). While the user device 110 implements a single audio capture device 116a in the example shown, the user device 110 may implement an array of audio capture devices 116a without departing from the scope of the present disclosure, whereby one or more capture devices 116a in the array may not physically reside on the user device 110, but be in communication with the audio subsystem 116. The user device 110 is further configured to perform speech recognition processing on the streaming audio data 12 using a speech recognizer 200. The speech recognizer 200 (also referred to as the model 200) resides on the user device 110 (e.g., hardware 110, 112) of the user 10 and/or on a remote computing device 60 (e.g., one or more remote servers of a distributed system executing in a cloud-computing environment) in communication with the user device 10 via a network 40. In some examples, the audio subsystem 116 of the user device 110 that includes the audio capture device 116a is configured to receive audio data 12 (e.g., spoken utterances) and to convert the audio data 12 into a digital format compatible with the speech recognizer 200. The digital format may correspond to acoustic frames (e.g., parameterized acoustic frames), such as mel frames. For instance, the parameterized acoustic frames correspond to log-mel filterbank energies.

In some examples, such as FIG. 1A, the user 10 interacts with a program or application 118 of the user device 110 that uses the speech recognizer 200. For instance, FIG. 1A depicts the user 10 communicating with an automated assistant application. In this example, the user 10 asks the automated assistant, "What time is the concert tonight?" This question from the user 10 is a spoken utterance 12 captured by the audio capture device 116a and processed by audio subsystems 116 of the user device 110. In this example, the speech recognizer 200 of the user device 110 receives the audio input 202 (e.g., as acoustic frames) of "what time is the concert tonight" and transcribes the audio input 202 into a transcription 204 (e.g., a text representation of "what time is the concert tonight?"). Here, the automated assistant of the application 118 may respond to the question posed by the user 10 using natural language processing. Natural language processing generally refers to a process of interpreting written language (e.g., the transcription 204) and determining whether the written language prompts any action. In this example, the automated assistant uses natural language processing to recognize that the question from the user 10 regards the user's schedule and more particularly a concert on the user's schedule. By recognizing these details with natural language processing, the automated assistant returns a response to the user's query where the response states, "Doors open at 8:30 pm for the concert tonight." In some configurations, natural language processing may occur on a remote system in communication with the data processing hardware 112 of the user device 110.

FIG. 1B is another example of speech recognition with the speech recognizer 200. In this example, the user 10 associated with the user device 110 is communicating with a friend named Jane Doe with a communication application 118. Here, the user 10 named Ted, communicates with Jane by having the speech recognizer 200 transcribe his voice inputs. The audio capture device 116 captures these voice inputs and communicates them in a digital form (e.g., acoustic frames) to the speech recognizer 200. The speech recognizer 200 transcribes these acoustic frames into text that is sent to Jane via the communication application 118. Because this type of application 118 communicates via text, the transcription 204 from the speech recognizer 200 may be sent to Jane without further processing (e.g., natural language processing).

Figure 2:
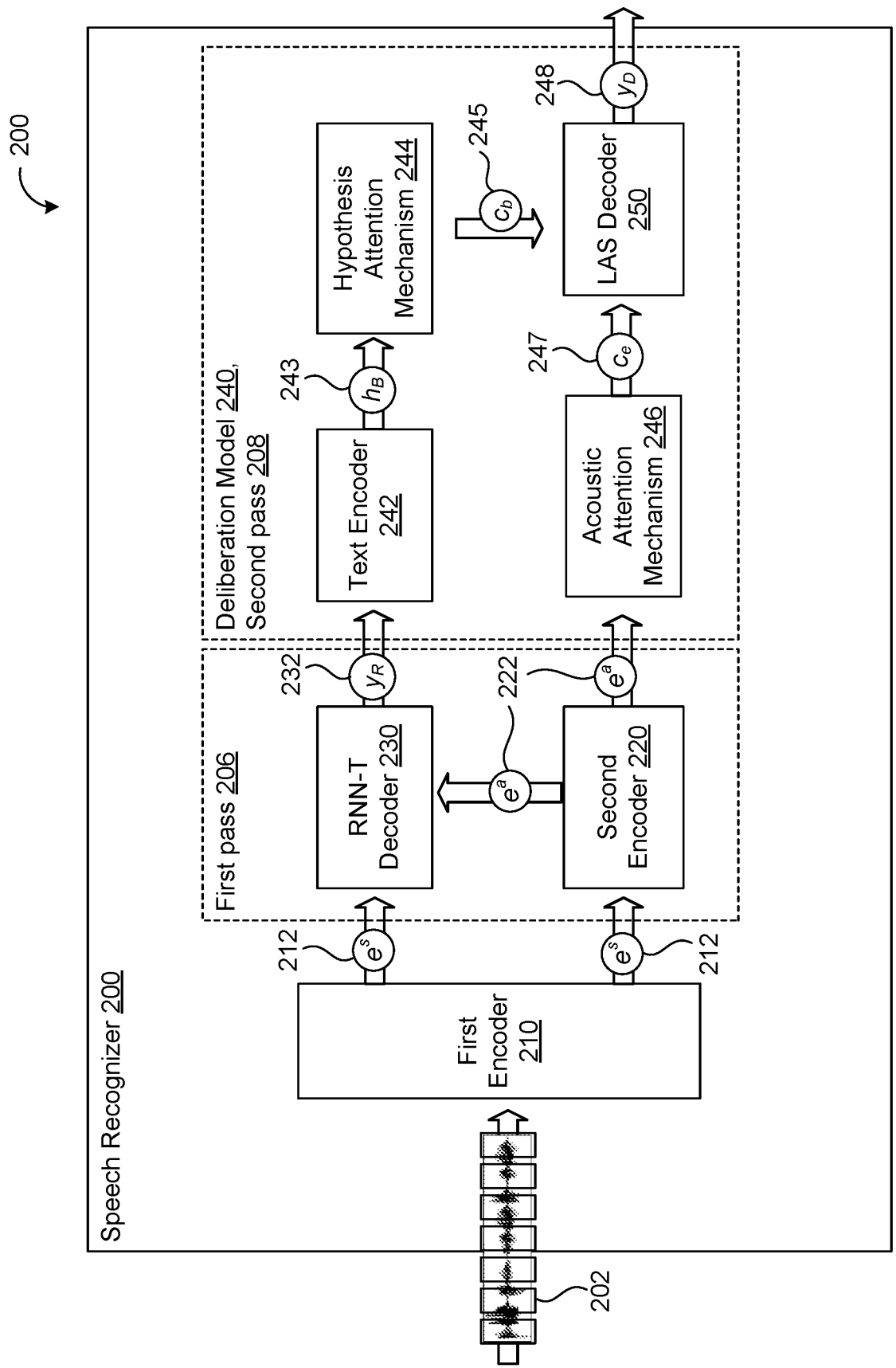
FIG. 2 is a schematic view of the example deliberation two-pass architecture for speech recognition.

In some examples, such as FIG. 2, the speech recognizer 200 is configured in an enhanced two-pass architecture having a first pass 206 followed by a second pass 208. Generally speaking, the two-pass architecture of the speech recognizer 200 includes a first encoder 210 (e.g., a causal encoder 210), a second encoder 220 (e.g., a non-causal encoder 220), an RNN-T decoder 230, and a deliberation model 240. In two-pass decoding, the second pass 208 may improve the initial outputs from the first pass 206 with techniques such as lattice rescoring or n-best re-ranking. In other words, the RNN-T decoder 230 produces streaming predictions and the deliberation model 240 finalizes the prediction. Here, specifically, the deliberation model 240 rescores streamed hypotheses 232 $y_R$ from the RNN-T decoder 230. Although it is generally discussed that the deliberation model 240 functions in a rescoring mode that rescores hypotheses 232 $y_R$ from the RNN-T decoder 230, the deliberation model 240 is also capable of operating in different modes, such as a beam search mode, depending on design or other factors (e.g., utterance length).

As shown in FIG. 2, the first pass 206 includes the first encoder 210 and the second encoder 220 arranged in cascade, which refers to a model structure where the encoding pathway includes two encoders 210, 220 that cascade such that the output of one encoder 210 feeds the input of the other encoder 220 prior to decoding. Here, the encoders 210, 220 can be cascaded irrespective of the underlying architecture for each encoder. In some examples, the encoders 210, 220 include a stack of 512-dimension conformer layers. Causal convolution and left-context attention layers may be used for each conformer layer to strictly restrict the model to use no future inputs. A multi-headed (e.g., 8 heads) attention mechanism may be used in a self-attention layer. The cascaded encoders, 210, 220 may include 21 conformer layers. Here, the first encoder 210 may include 17 conformer layers while the second encoder 220 may include four conformer layers that take in additional right context (e.g., 0.9 seconds). Optionally, other types of layers incorporating self-attention mechanisms, such as transformer layers, may be used in lieu of conformer layers. The first encoder 210 may be referred to as a causal encoder and the second encoder 220 may be referred to as a non-causal encoder.

In other implementations, one encoder is constructed with an LSTM structure while the other encoder is constructed using bi-directional LSTM layers or conformer layers (e.g., a conformer-transducer). In other words, the encoders 210, 220 may have different architectures or similar architectures. For instance, the cascading encoders 210, 220 may be roughly analogous to an acoustic model (AM) in a traditional ASR system, and may include a recurrent network of stacked Long Short-Term Memory (LSTM) layers. Here, the first encoder 210 is a streaming encoder that includes unidirectional Long Short Term Memory (LSTM) layers while the second encoder 220 is a non-streaming encoder that includes bidirectional LSTM layers or conformer layers. In a cascading encoder, where both encoders 210, 220 include LSTM layers, the second encoder 220 that receives the output of the first encoder 210 may take advantage of the LSTM layers of the first encoder 210 such that the second encoder 220 includes fewer LSTM layers than the first encoder 210 (and fewer LSTM layers than a fully non-streaming model). By having fewer LSTM layers, the cascading encoders may reduce the number of more computationally expensive bidirectional layers making the speech recognizer 200 more streamlined than simply combining a traditional streaming model with a traditional non-streaming model.

The first encoder 210 reads a sequence of d-dimensional feature vectors (e.g., acoustic frames) $x=x_1, x_2, \ldots, x_T$), where $x_t \in \mathbb{R}^d$, and produces, at each time step, a first higher-order feature representation as an output 212. This first higher-order feature representation may include causal acoustic embeddings and is denoted as $e^s$. Similarly, the second encoder 220 is connected in cascade to the first encoder 210, and is trained to receive the first higher order feature $e^s$ as input, and produce a second higher order feature representation as an output 222. This second higher order feature representation includes non-causal acoustic embeddings and is denoted as $e^a$. Both the first encoder 210 and the second encoder 220 are directly connected to, and shared by the RNN-T decoder 230. Accordingly, the RNN-T decoder 230 receives both the first higher order feature representation $e^s$ and the second higher order feature representation $e^a$ as inputs. The RNN-T decoder 230 then decodes the first higher order feature representation $e^s$ and the second higher order feature representation $e^a$ into a first hypothesis speech recognition result $y_r$ 222. In some examples, each parameterized acoustic frame includes 128-dimensional log-mel features computed within a short shifting window (e.g., 32 milliseconds and shifted every 10 milliseconds). Each feature may be stacked with previous frames (e.g., three previous frames) to form a higher-dimensional vector (e.g., a 512-dimensional vector using the three previous frames). The features forming the vector may then be down-sampled (e.g., to a 30 millisecond frame rate).

In some implementations, the RNN-T decoder 230 includes a joint layer and an embedding prediction network. Here, the prediction network may have two LSTM layers of 2,048 hidden units and a 640-dimensional projection per layer as well as an embedding layer of 128 units. The RNN-T decoder 230 uses the joint layer to combine the first and second higher order feature representations $e^s$, $e^a$, output by the encoders 210, 220, as well as an embedding output from the prediction network for the previous prediction $y_{r-1}$), in order to produce a first pass hypothesis $y_r$, output 232. The decoder output 232 can be a probability distribution, $P(y_i|y_{i-1} \ldots, y_0, x)$, over the current sub-word unit, $y_i$, given the sequence of the N previous non-blank symbols previous units, $\{y_{i-1}, \ldots, y_{i-N}\}$, and input, x. In some examples, the joint network of the RNN-T decoder 230 includes 640 hidden units followed by a Softmax layer that predicts 4,096 mixed-case word pieces. In some implementations, the Softmax layer is separate from the RNN-T decoder 230 and processes the output 232, $y_r$, from the RNN-T decoder 230. The output of the Softmax layer is then used in a beam search process to select orthographic elements. In some implementations, the Softmax layer is integrated with the RNN-T decoder 230, such that the output 232, $y_r$, of the RNN-T decoder 230 represents the output of the Softmax layer.

With continued reference to FIG. 2, the second pass 208 uses a deliberation model 240 that includes a text encoder 242 and two attention mechanisms 244, 246, a hypothesis attention mechanism 244 and an acoustic attention mechanism 246, in addition to a deliberation decoder 250 (also referred to as an LAS decoder 250). As described in greater detail below (e.g., FIGS. 3A-3C), the text encoder 242 of the deliberation model 240 may be pre-trained using text-only (e.g., unspoken textual utterances) inputs. Here, the speech recognizer 200 attends to both acoustics, by attending to the second higher order feature representation $e^a$ output 222 of the second encoder 220 at the acoustic attention mechanism 246, and the first-pass hypotheses $y_r$, by attending to the outputs 232 of the RNN-T decoder 230 at the hypothesis attention mechanism 244. By attending to both acoustics (e.g., the output 222 represented as $e^a$) and the first-pass hypotheses (e.g., the output 232 represented as $y_r$), the deliberation model 240 generates the second pass hypothesis as output 248 (e.g., a prediction sequence). Here, each attention mechanism 244, 246 forms a context vector 245, 247 (e.g., a hypothesis context vector 245 and an acoustic context vector 247, or a first context vector 245 and a second context vector 247) that is input into the deliberation decoder 250 of the deliberation model 240. These context vectors 245, 247 may be concatenated as inputs into the deliberation decoder 250.

Figure 4:
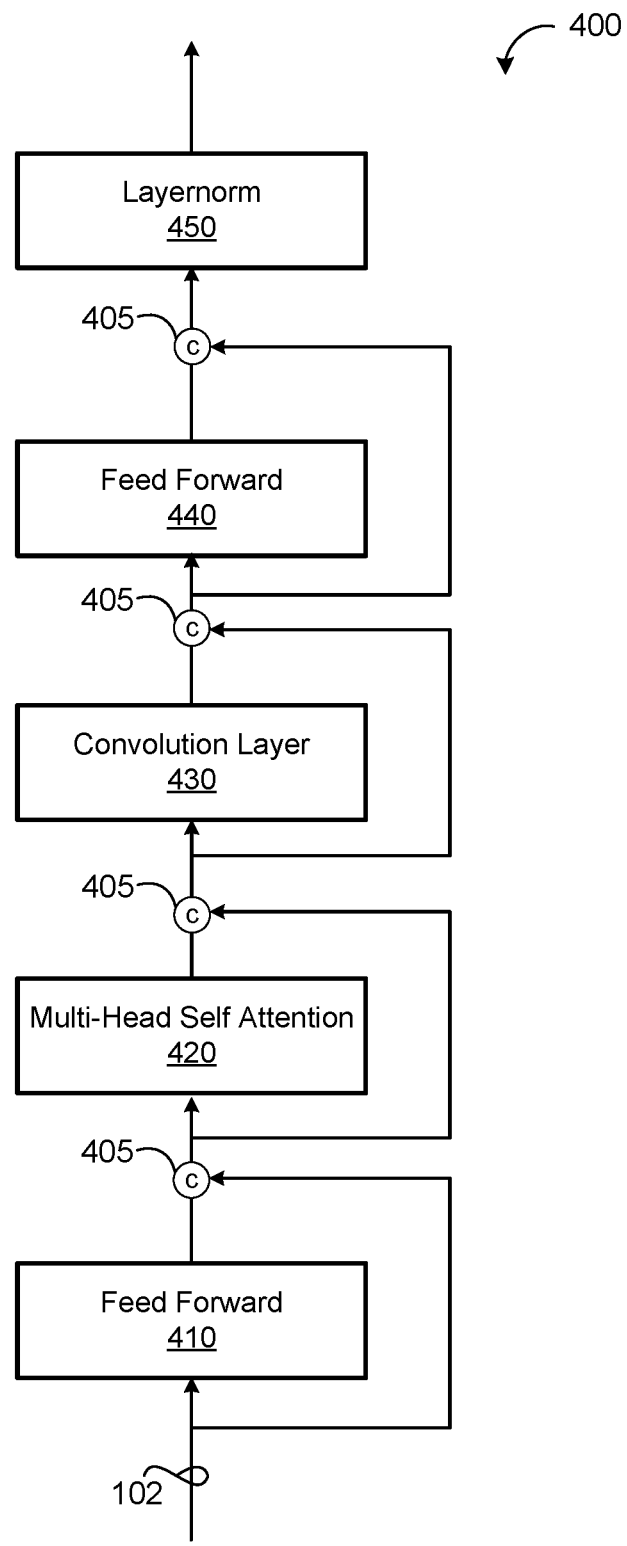
FIG. 4 is a schematic view of an example Conformer block.

The text encoder 242 further encodes the output 232 of the RNN-T decoder 230 (i.e., the output 232 of the first pass 206) to form the encoded hypotheses 243 (e.g., shown as $h_B$). When further encoding the output 232, the text encoder 242 may also encode the output 232 for useful context information to include in the encoded hypotheses 243. For example, the text encoder 242 is a bidirectional encoder capable of including the context information. The text encoder 242 may also be configured to encode multiple first hypotheses (i.e., output 232). For instance, the text encoder 242 encodes each hypothesis 232 separately and then concatenates each encoded hypothesis together. The text encoder 242 may include a stack of multi-head attention blocks 400 (referred to herein as conformer blocks 400) which may include conformers or transformers. Each multi-head attention block 400 may include a multi-head attention mechanism 420 (FIG. 4). For example, the text encoder 242 may be a two-layer conformer encoder, where each layer has a 640-dimensional projection per layer with a multi-token (e.g., two token) right context.

During the second pass 208, the speech recognizer 200 may perform a beam search mode or a rescoring mode to generate the output 248 (i.e., the second pass hypothesis). In a rescoring mode, the deliberation model 240 may run on the output 232 in a teacher-forcing mode. Additionally or alternatively, when in a rescoring mode, using a bidirectional text encoder 242 may help to improve the relative WER of the deliberation decoder two-pass architecture of the deliberation model 240. When the deliberation decoder 250 operates in a beam search mode, the deliberation decoder 250 produces the second pass hypothesis as the output 248 from the output 222 alone; ignoring the output 232 of the RNN-T decoder 230. When the deliberation decoder 250 operates in the rescoring mode, the deliberation decoder 250 obtains the top-K hypotheses (e.g., 4 first-pass hypotheses) from the RNN-T decoder 230 and then the deliberation decoder 250 is run on each sequence in a teacher-forcing mode, with attention on the output 222, to compute a score. For example, a score combines a log probability of the sequence and an attention coverage penalty. The deliberation decoder 250 selects a sequence with the highest score to be the output 222. Here, the deliberation decoder 250 may include multi-headed attention (e.g., with four heads) to attend to the output 222. Furthermore, the deliberation decoder 250 may be a two-layer LSTM network followed by a softmax layer for prediction. For instance, each layer of the deliberation decoder 250 has 2,048 hidden units followed by a 640-dimensional projection. The softmax layer may include 4,096 dimensions to predict the same mixed-case word pieces from the softmax layer of the RNN-T decoder 230. Much like the attention mechanism inherent to the deliberation decoder 250 as described above, the attention mechanisms 244, 246 may have a similar structure such that each attention mechanism 244, 246 includes multi-headed attention (e.g., eight heads).

A neural network is generally trained by back propagation that defines a loss function (e.g., a cross-entropy loss function). For instance, the loss function is defined as a difference between the actual outputs of the network and the desired outputs of the network. Here, the speech recognizer 200 may be trained using a cross entropy loss approach, a joint training approach, or a combination of cross entropy loss and joint training. In a cross entropy loss approach, a deliberation model, such as the speech recognizer 200 with the deliberation model 240 (i.e., deliberation-based speech recognizer 200), is trained in a two-step training process. During the first step of the training process, the RNN-T decoder 230 is trained. After the RNN-T decoder 220 has been trained, parameters for the RNN-T decoder 230 are fixed and only the deliberation model 240 and additional encoder layers (e.g., the text encoder 242) are trained.

FIGS. 3A-3C show example training processes 300a-300c for training the deliberation model 240 of the speech recognizer 200. In some configurations, the training processes 300a-300c execute on the remote computing device 60 of FIGS. 1A and 1B. The training processes 300a-c obtain set of training data 320, 320a-n stored in a sample database 310 and trains the deliberation model 240 on the training data 320. The training data 320 includes a plurality of training unspoken textual utterances 330, 330a-n. Here, each training unspoken textual utterance 330 is not paired with any corresponding spoken utterance of non-synthetic speech. The sample database 310 may reside on the memory hardware of the remote computing device 60. In the examples shown, the training data 320 is chosen to train the deliberation model 240 that includes the text encoder 242 and the deliberation decoder 250. Here, the deliberation model 240 receives the training data 320 and generates an output which is tested for its accuracy. While FIGS. 3A-3C depict separate training processes 300a-c, it should be appreciated that deliberation decoder 250 may be trained by any combination of the training processes 300a-c.

Referring to FIG. 3A, a training process 300a trains the deliberation model 240 by pre-training the text encoder 242 on each training unspoken textual utterance 330 in the training data 320. Here, the training process 300a includes a masking module 340 that processes each training unspoken textual utterance 330 before training the text encoder 242 using cross entropy loss. The masking module 340 includes a token module 342 and a masker 346. Intuitively, because the text encoder 242 is bi-directional (i.e., it has both right and left context), it can easily predict target words within a training sample. In order to train the text encoder 242, a percentage of each of the training unspoken textual utterance 330 are masked at random. The token module 342 obtains each corresponding training unspoken textual utterance 330 and tokenizes the corresponding training unspoken textual utterance 330 into a tokenized sequence of sub-word units 344, 344a-n. The masker 346 receives the tokenized sequence of sub-word units 344 and randomly chooses a percentage (e.g., 15%) of the tokenized sequence of sub-word units 344 to replace with a differing token. For example, the masker 346 replaces each tokenized sub-word unit 344 in a first portion of the tokenized sequence of sub-words units 344 with a mask token 344M, and replaces each tokenized sub-word unit 344 in a second portion of the tokenized sequence of sub-word units 344 with a random token 344M. In particular, the masker 346 replaces each tokenized sub-word unit 344 in the tokenized sequence of sub-word units 344 with a mask token 344M 80% of the time, with a random token 344R 10% of the time, and leaves the tokenized sub-word unit 344 unchanged 10% of the time. For example, as shown in FIG. 3A, the masking module 340 obtains the training unspoken textual utterance 330a and tokenizes (i.e., using the token module 340) the training unspoken textual utterance 330a into the sequence of sub-word units 344 to produce four tokenized sub-word units 344. The masker 346 receives the four tokenized sub-word units 344, and outputs two tokenized sub-word units 344 that are unchanged, one mask token 344M, and one random token 344R. Once the training process 300a is complete, the parameters of the text encoder 242 and the deliberation decoder 250 are updated jointly in additional training, while the parameters for the RNN-T decoder 230 remain fixed.

Referring to FIG. 3B, a training process 300b trains the deliberation model 240 using the training unspoken textual utterances 330 in the training data 320. Here, the training process 300b includes a text-to-speech module 350 that processes each training unspoken textual utterance 330 before training the deliberation model 340. In particular, the text-to-speech module 350 obtains each training unspoken textual utterance 330 and generates, using a text-to-speech model, a corresponding synthetic speech representation 352. The training process 300b then trains the deliberation model 240 using the training unspoken textual utterance 330 and the corresponding synthetic speech representation 352. For example, as shown in FIG. 3B, the text-to-speech module 350 receives the training unspoken textual utterance 330a and generates, using the text-to-speech model, the corresponding synthetic speech representation 352 as output. The training process 300b then jointly trains the deliberation model 240 using the training unspoken textual utterance 330a and the corresponding synthetic speech representation 352. The training process 300b may compute both audio and text attention when using the training unspoken textual utterance 330a and fixed context vectors to replace the attention when the corresponding synthetic speech representation 352 is used. The training process 300b may select a mix (e.g., a 1:9 ratio) of the training unspoken textual utterances 330 and the corresponding synthetic speech representation 352 when training the deliberation model 240.

Referring to FIG. 3C, a training process 300c trains the deliberation model 240 using the training data 320. Here, training data 320 further includes a plurality of training un-transcribed non-synthetic speech utterances 332, 332a-n. Here, each training un-transcribed non-synthetic speech utterance 332 is not paired with a corresponding transcription. The training process 300c may use a trained speech recognition model 360 (also referred to as an ASR model 360) that is trained to predict, based on an input utterance, a corresponding transcription of the input utterance as output. In particular, the ASR model 360 obtains each training un-transcribed non-synthetic speech utterance 332 and generates a corresponding transcription 362. The training process 300c then trains the deliberation model 240 by training the deliberation decoder 250 using the training un-transcribed non-synthetic speech utterance 332 and the corresponding transcription 362. For example, as shown in FIG. 3C, the ASR model 360 receives the training un-transcribed non-synthetic speech utterance 332a and generates, using the ASR model 360, the corresponding transcription 362 as output. The training process 300c then trains the deliberation decoder 250 using the training un-transcribed non-synthetic speech utterances 332 and the corresponding predicted transcriptions 362 as semi-supervised data.

FIG. 4 provides an example of a Conformer block 400 from the stack of Conformer layers of the text encoder 242. The Conformer block 400 includes a first half feed-forward layer 410, a second half feed-forward layer 440, with a multi-head self-attention block 420 and a convolution layer 430 disposed between the first and second half feed-forward layers 410, 440, and concatenation operators 405. The first half feed-forward layer 410 processes the input hypotheses (e.g., the output 232 from the RNN-T decoder 230). Subsequently, the multi-head self-attention block 420 receives the input hypotheses concatenated with the output of the first half-feed forward layer 410. Intuitively, the role of the multi-head self-attention block 420 is to summarize context separately for each input frame that is to be enhanced. A convolution layer 430 subsamples the output of the multi-head self-attention block 420 concatenated with the output of the first half feed forward layer 410. Thereafter, a second half-feed forward layer 440 receives a concatenation of the convolution layer 430 output and the multi-head self-attention block 420. A layernorm module 450 processes the output from the second half feed-forward layer 440. Mathematically, the conformer block 400 transforms input features x, using modulation features m, to produce output features y, as follows:

$$\hat{x} = x + r(m) \odot x + h(m) \quad (1)$$
$$\bar{x} = \hat{x} + \frac{1}{2}FFN(\hat{x}), \bar{n} = n + \frac{1}{2}FFN(n)$$
$$x' = \bar{x} + Conv(\bar{x}), n' = \bar{n} + Conv(\bar{n})$$
$$x'' = x' + MHCA(x', n')$$
$$x''' = x' \odot r(x'') + h(x'')$$
$$x'''' = x' + MHCA(x', x''')$$
$$y = LayerNorm\left(x'''' + \frac{1}{2}FFN(x'''')\right).$$

Figure 5:
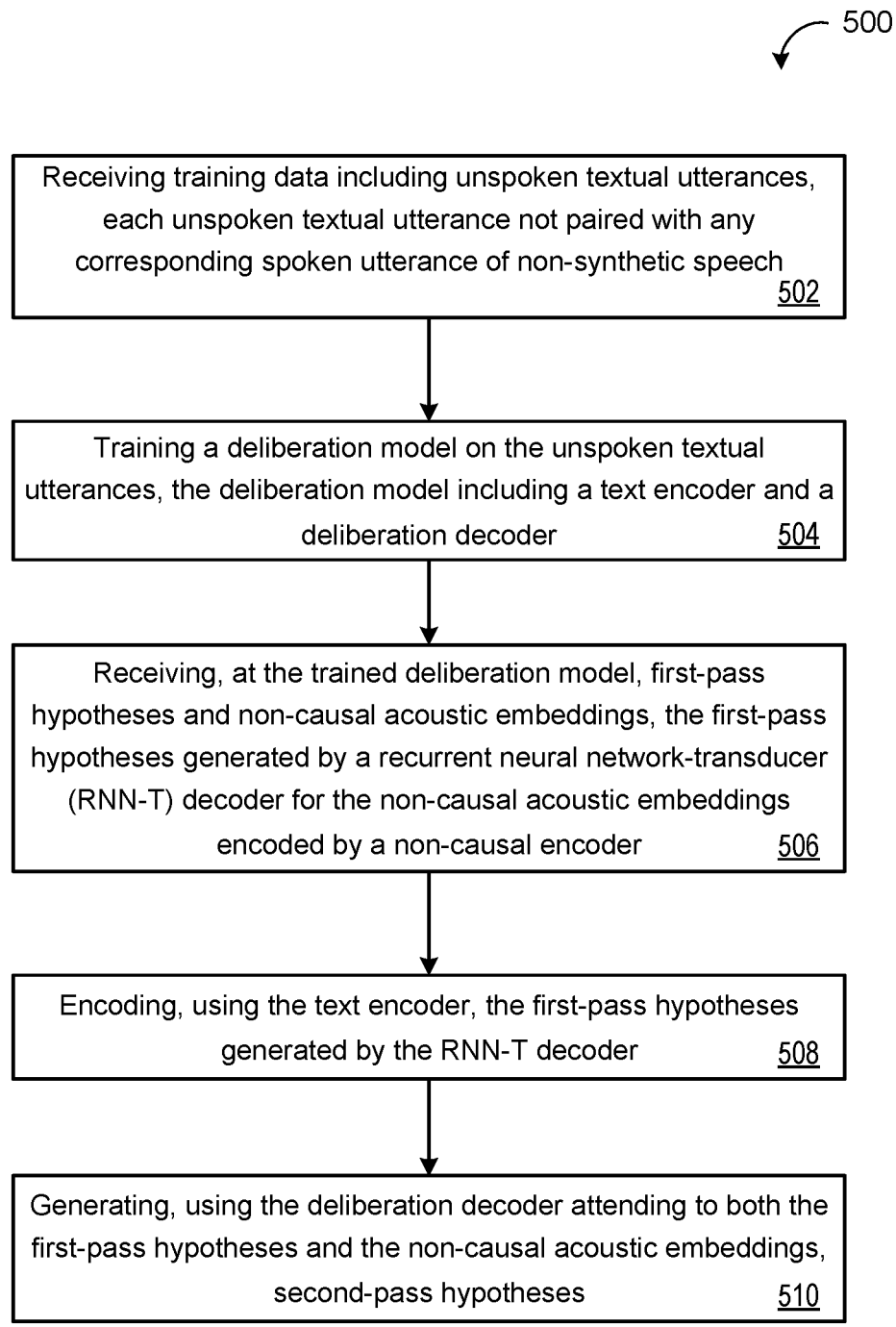
FIG. 5 is a flowchart of an example arrangement of operations for a method of performing speech recognition.

FIG. 5 is a flowchart of an example arrangement of operations for a method 500 of performing automated speech recognition (e.g., ASR) using a deliberation two-pass architecture. At operation 502, the method 500 receives training data 320 including unspoken textual utterances 330. Here, each unspoken textual utterance 330 is not paired with any corresponding spoke utterance of non-synthetic speech. At operation 504, the method 500 includes training a deliberation model 240 on the unspoken textual utterances 330. The deliberation model 240 includes a text encoder 242 and a deliberation decoder 250.

At operation 506, the method 500 includes receiving, at the trained deliberation model 240, first-pass hypotheses 232 and non-causal acoustic embeddings 222. The first-pass hypotheses 232 are generated by a recurrent neural network-transducer (RNN-T) decoder 230 for the non-causal acoustic embeddings 222 encoded by a non-causal encoder 220. The method 500 also includes, at operation 508, encoding, using the text encoder 242, the first-pass hypotheses 232 generated by the RNN-T decoder 230. At operation 510, the method 500 further includes generating, using the deliberation decoder 250 attending to both the first-pass hypotheses 232 and the non-casual acoustic embeddings 222, second-pass hypotheses 248.

Figure 6:
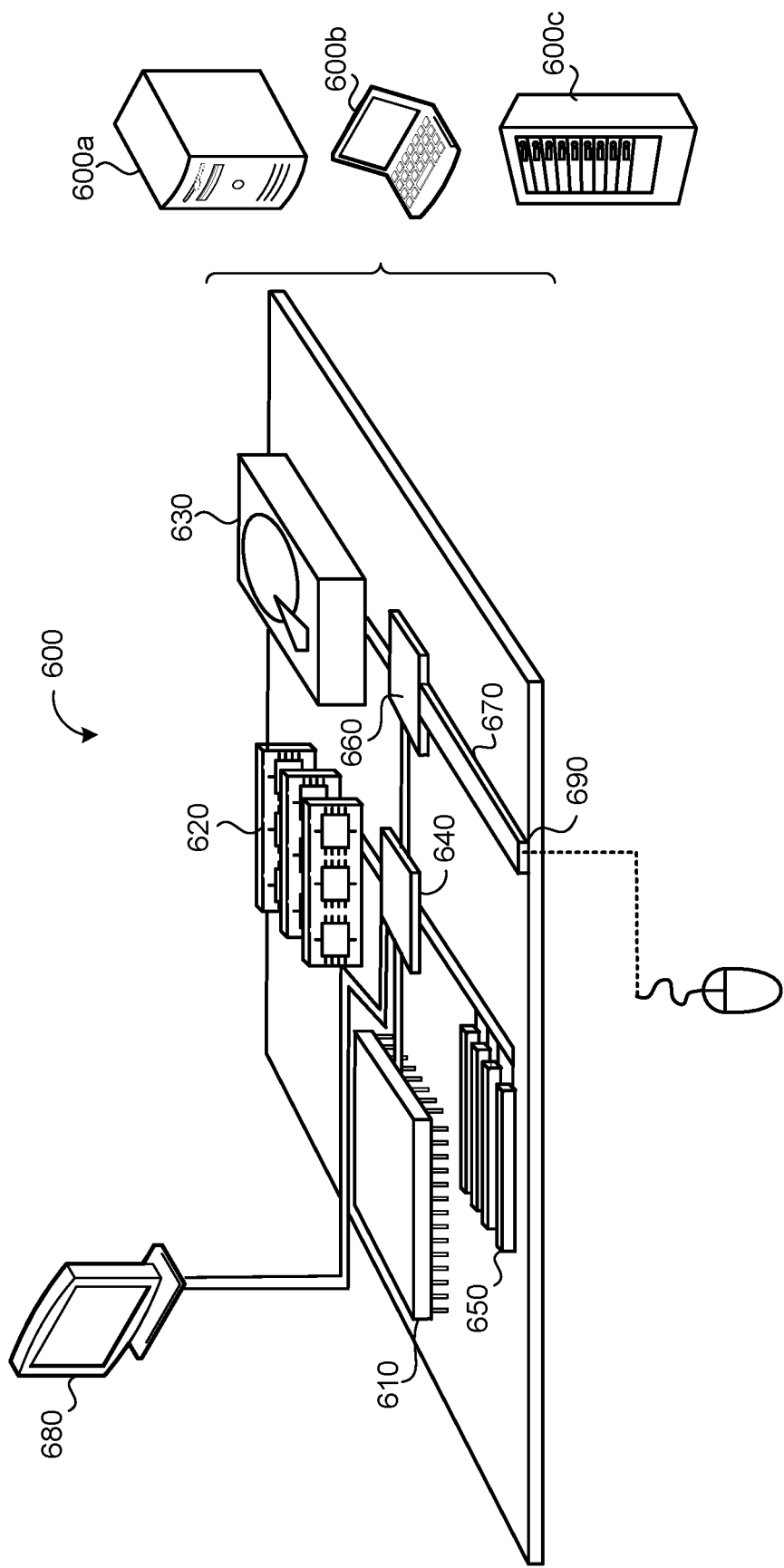
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 (e.g., data processing hardware 112, or data processing hardware of remote computing device 60 of FIG. 1) can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 (e.g., memory hardware 114 or memory hardware of remote computing device 60 of FIG. 1) stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   receiving training data comprising unspoken textual utterances, each unspoken textual utterance not paired with any corresponding spoken utterance of non-synthetic speech;
   training a deliberation model on the unspoken textual utterances, the deliberation model comprising a text encoder and a deliberation decoder;
   receiving, at the trained deliberation model, first-pass hypotheses and non-causal acoustic embeddings, the first-pass hypotheses generated by a recurrent neural network-transducer (RNN-T) decoder for the non-causal acoustic embeddings encoded by a non-causal encoder;
   encoding, using the text encoder, the first-pass hypotheses generated by the RNN-T decoder; and
   generating, using the deliberation decoder attending to both the first-pass hypotheses and the non-causal acoustic embeddings, second-pass hypotheses.

2. The computer-implemented method of claim 1, wherein the operations further comprise:
- receiving a sequence of acoustic frames;
- encoding, using a causal encoder, each acoustic frame in the sequence of acoustic frames into a corresponding causal acoustic embedding;
- generating, using the non-causal encoder configured to receive the encoded causal acoustic embeddings as input, the non-causal acoustic embeddings; and
- decoding, using the RNN-T decoder, the non-causal acoustic embeddings to generate the first-pass hypotheses.

3. The computer-implemented method of claim 1, wherein the deliberation decoder comprises a long short-term memory (LSTM) network followed by a softmax layer.

4. The computer-implemented method of claim 3, wherein the LSTM network comprises at least two layers.

5. The computer-implemented method of claim 1, wherein the text encoder comprises a stack of self-attention blocks each having a multi-headed self-attention mechanism.

6. The computer-implemented method of claim 5, wherein each self-attention block comprises one of a Conformer block or a Transformer block.

7. The computer-implemented method of claim 1, wherein training the deliberation model comprises pre-training the text encoder on each unspoken textual utterance by:
- tokenizing the corresponding unspoken textual utterance into a sequence of sub-word units;
- replacing each tokenized sub-word unit in a first portion of the tokenized sequence of sub-word units with a mask token; and
- replacing each token sub-word unit in a second portion of the tokenized sequence of sub-word units with a random token.

8. The computer-implemented method of claim 1, wherein training the deliberation model comprises:
- generating, using a text-to-speech model, a corresponding synthetic speech representation for each unspoken textual utterance of the received training data; and
- training the deliberation model using the unspoken textual utterances and corresponding synthetic speech representations.

9. The computer-implemented method of claim 1, wherein:
- the training data further comprises un-transcribed non-synthetic speech utterances, each un-transcribed non-synthetic speech utterance not paired with a corresponding transcription; and
- the operations further comprise:
  - predicting, using a trained speech recognition model, the corresponding transcription for each un-transcribed non-synthetic speech utterance; and
  - training the deliberation model further comprises training the deliberation decoder using the un-transcribed non-synthetic speech utterances and the corresponding predicted transcriptions as semi-supervised data.

10. The computer-implemented method of claim 1, wherein generating the second-pass hypotheses comprises:
- generating, using a first attention mechanism attending to the encoded first-pass hypotheses, first context vectors;
- generating, using a second attention mechanism attending to the non-causal acoustic embeddings, second context vectors; and
- decoding the first context vectors and the second context vectors at the deliberation decoder to form the second-pass hypotheses.

11. A system comprising:
- data processing hardware; and
- memory hardware storing instructions that when executed on the data processing hardware cause the data processing hardware to perform operations comprising:
  - receiving training data comprising unspoken textual utterances, each unspoken textual utterance not paired with any corresponding spoken utterance of non-synthetic speech;
  - training a deliberation model on the unspoken textual utterances, the deliberation model comprising a text encoder and a deliberation decoder;
  - receiving, at the trained deliberation model, first-pass hypotheses and non-causal acoustic embeddings, the first-pass hypotheses generated by a recurrent neural network-transducer (RNN-T) decoder for the non-causal acoustic embeddings encoded by a non-causal encoder;
  - encoding, using the text encoder, the first-pass hypotheses generated by the RNN-T decoder; and
  - generating, using the deliberation decoder attending to both the first-pass hypotheses and the non-causal acoustic embeddings, second-pass hypotheses.

12. The system of claim 11, wherein the operations further comprise:
- receiving a sequence of acoustic frames;
- encoding, using a causal encoder, each acoustic frame in the sequence of acoustic frames into a corresponding causal acoustic embedding;
- generating, using the non-causal encoder configured to receive the encoded causal acoustic embeddings as input, the non-causal acoustic embeddings; and
- decoding, using the RNN-T decoder, the non-causal acoustic embeddings to generate the first-pass hypotheses.

13. The system of claim 11, wherein the deliberation decoder comprises a long short-term memory (LSTM) network followed by a softmax layer.

14. The system of claim 13, wherein the LSTM network comprises at least two layers.

15. The system of claim 11, wherein the text encoder comprises a stack of self-attention blocks each having a multi-headed self-attention mechanism.

16. The system of claim 15, wherein each self-attention block comprises one of a Conformer block or a Transformer block.

17. The system of claim 11, wherein training the deliberation model comprises pre-training the text encoder on each unspoken textual utterance by:
- tokenizing the corresponding unspoken textual utterance into a sequence of sub-word units;
- replacing each tokenized sub-word unit in a first portion of the tokenized sequence of sub-word units with a mask token; and
- replacing each token sub-word unit in a second portion of the tokenized sequence of sub-word units with a random token.

18. The system of claim 11, wherein training the deliberation model comprises:
- generating, using a text-to-speech model, a corresponding synthetic speech representation for each unspoken textual utterance of the received training data; and training the deliberation model using the unspoken textual utterances and corresponding synthetic speech representations.

19. The system of claim 11, wherein:
the training data further comprises un-transcribed non-synthetic speech utterances, each un-transcribed non-synthetic speech utterance not paired with a corresponding transcription; and
the operations further comprise:
  predicting, using a trained speech recognition model, the corresponding transcription for each un-transcribed non-synthetic speech utterance; and
  training the deliberation model further comprises training the deliberation decoder using the un-transcribed non-synthetic speech utterances and the corresponding predicted transcriptions as semi-supervised data.

20. The system of claim 11, wherein generating the second-pass hypotheses comprises:
generating, using a first attention mechanism attending to the encoded first-pass hypotheses, first context vectors;
generating, using a second attention mechanism attending to the non-causal acoustic embeddings, second context vectors; and
decoding the first context vectors and the second context vectors at the deliberation decoder to form the second-pass hypotheses.

* * * * *